May 4, 1954 A. POTDEVIN 2,677,319
APPARATUS FOR FORMING A VALVE IN A BAG AND APPLYING
A SUPPLEMENTAL SLEEVE-FORMING SHEET THRERETO
Filed Sept. 23, 1950 10 Sheets-Sheet 3

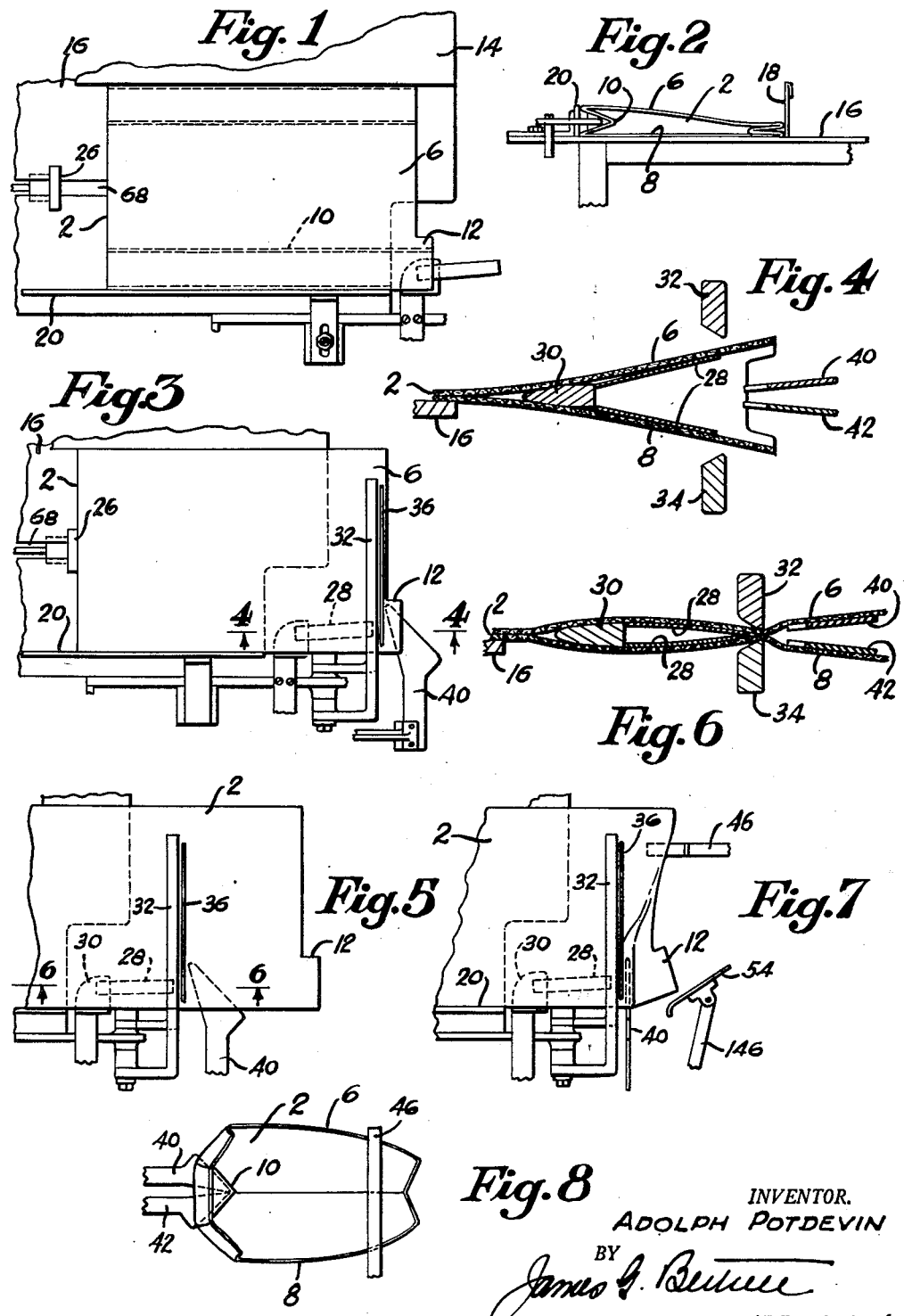

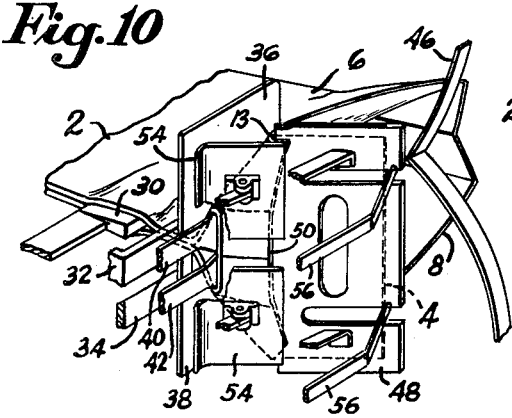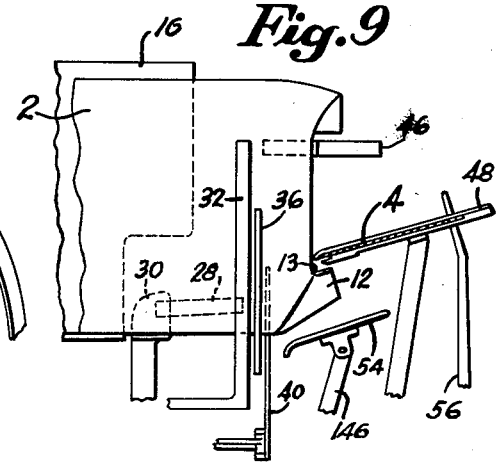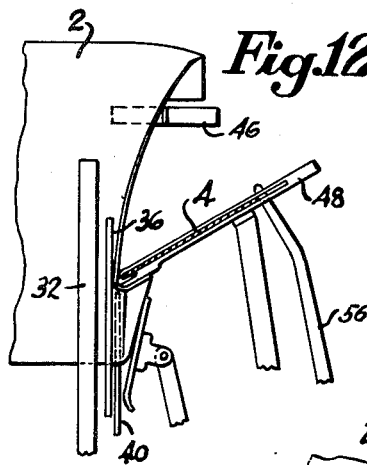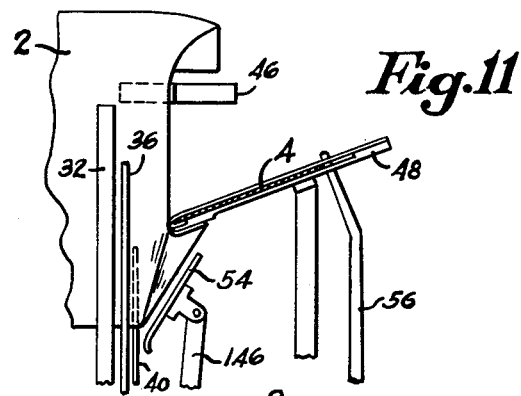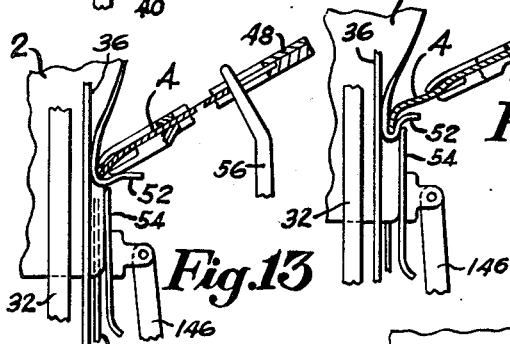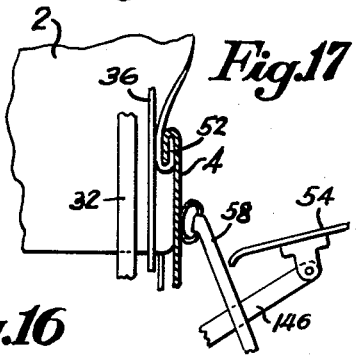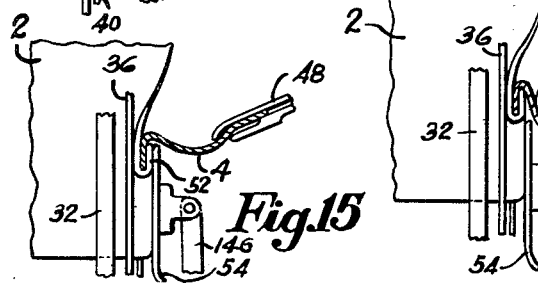

INVENTOR.
ADOLPH POTDEVIN
BY
James G. Bethell
ATTORNEY

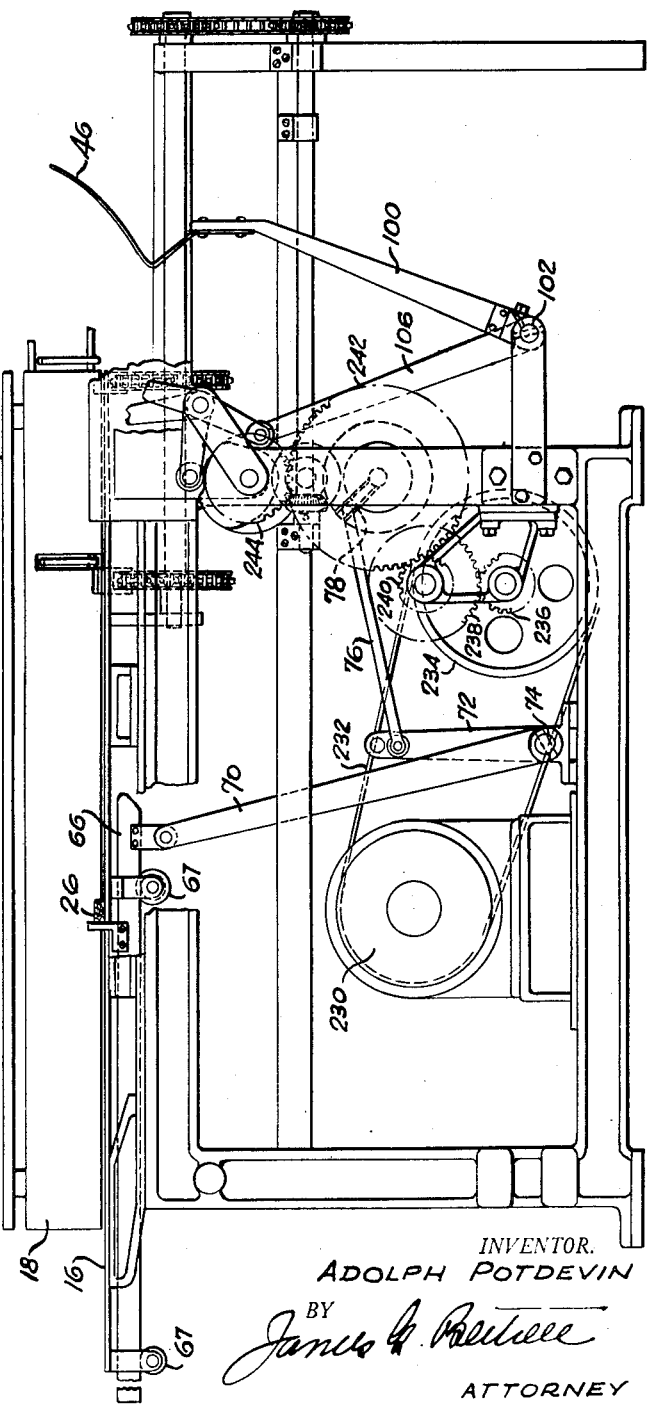

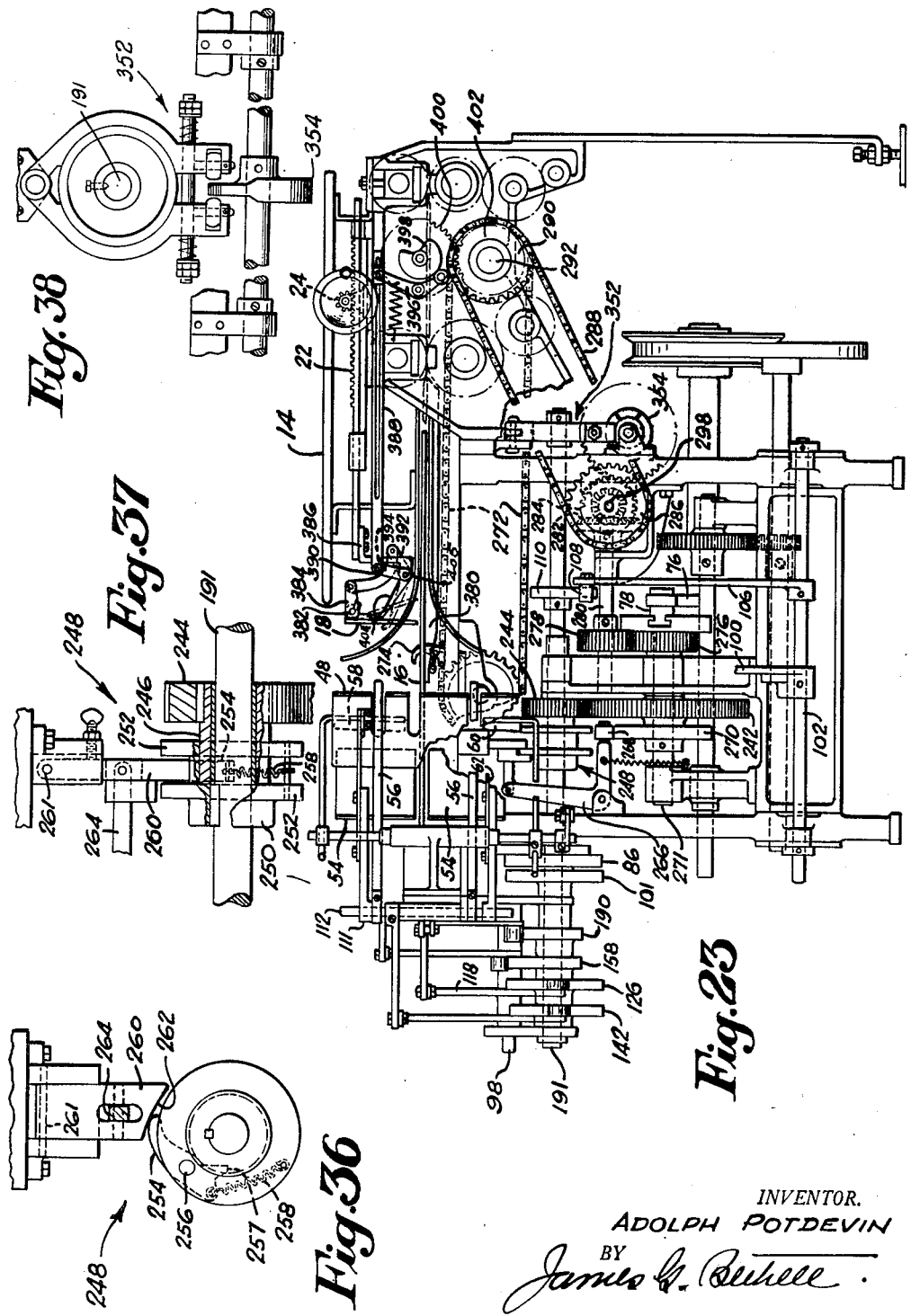

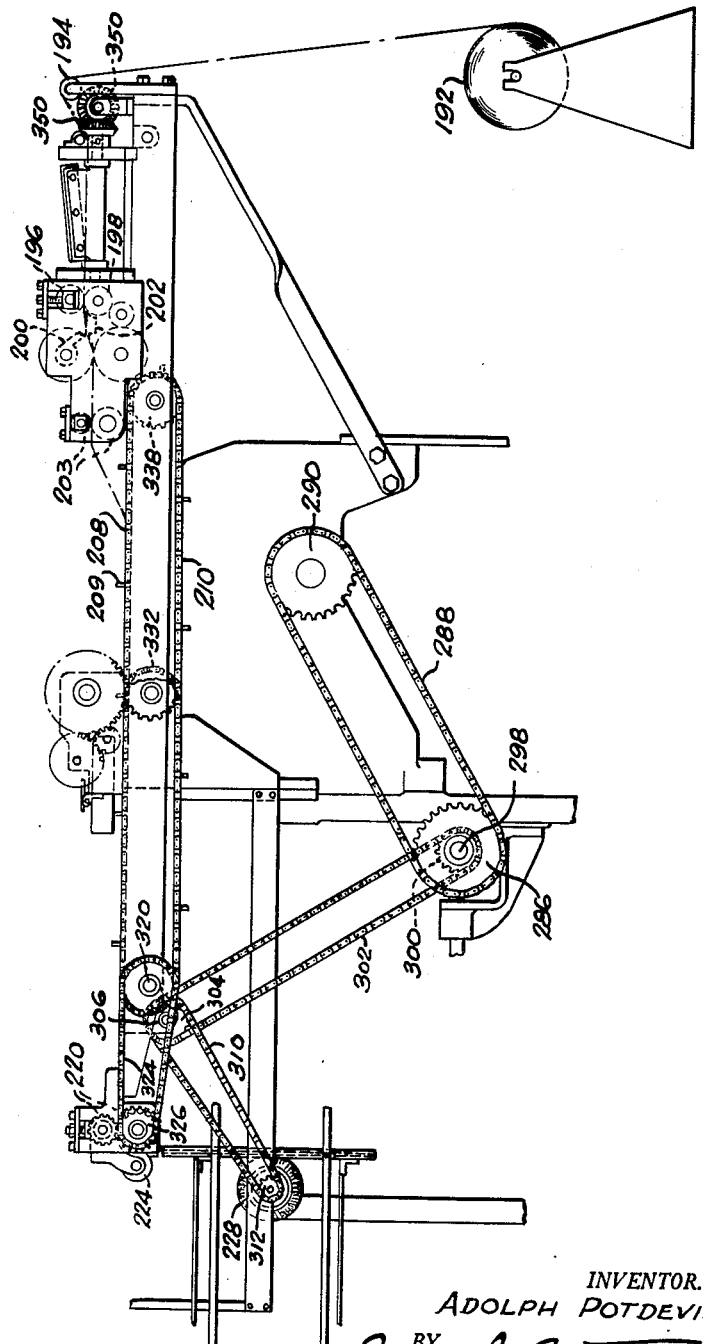

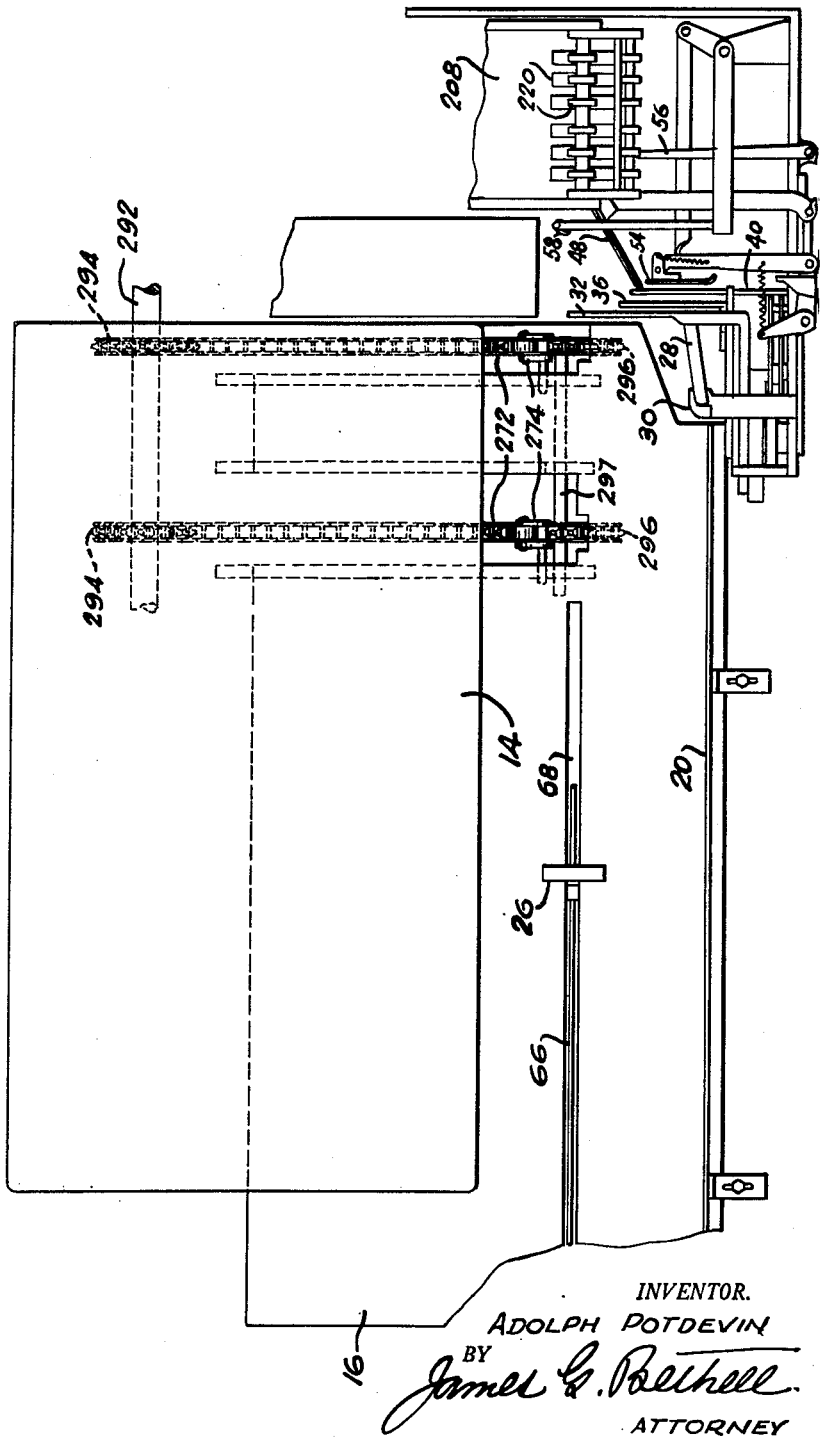

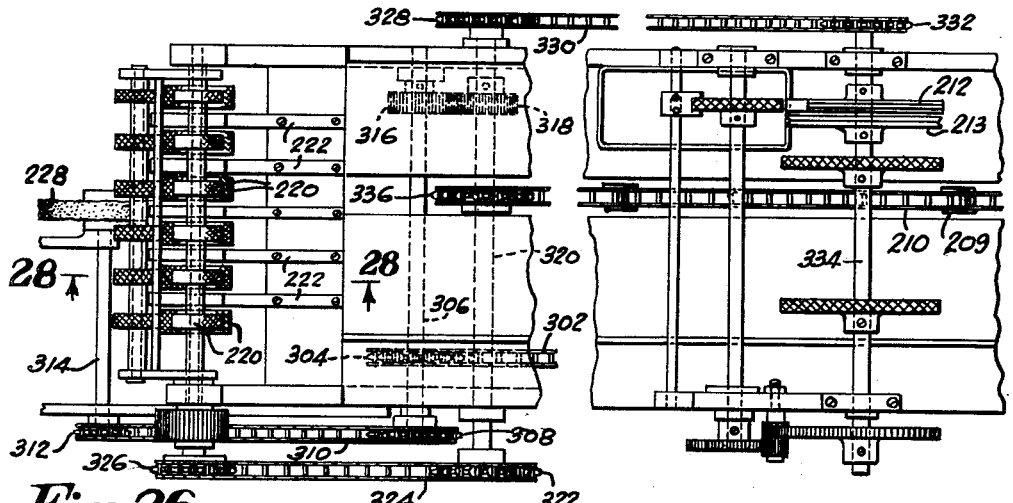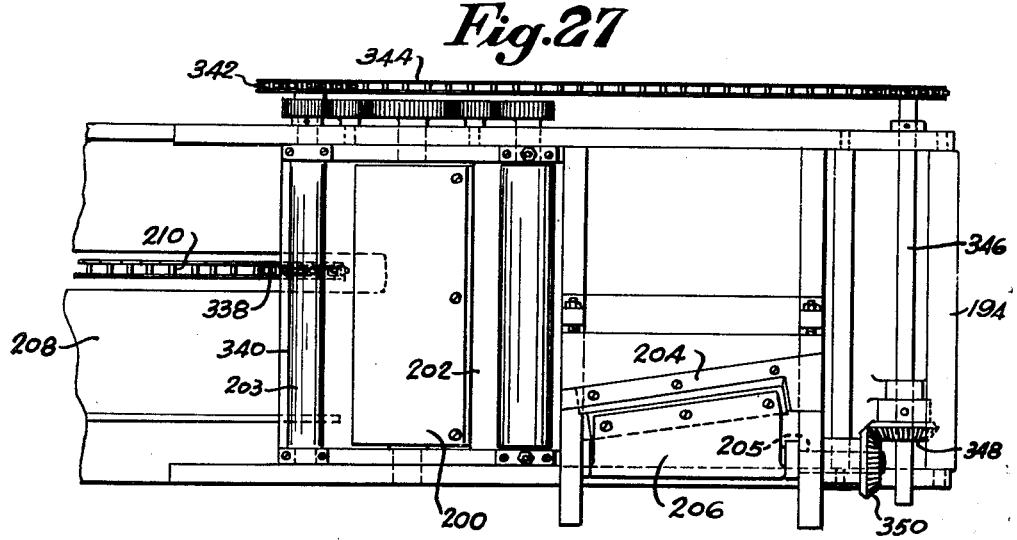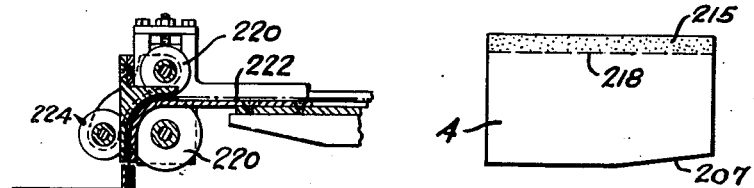

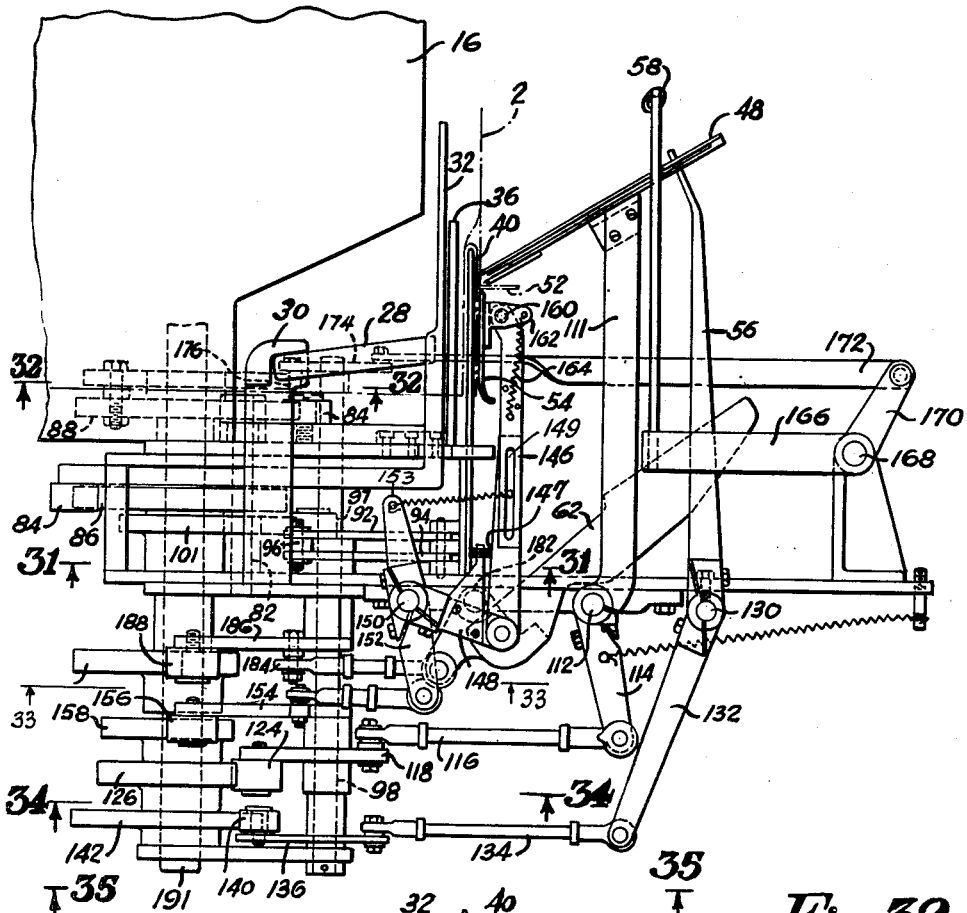

INVENTOR.
ADOLPH POTDEVIN
BY
James G. Bewell
ATTORNEY

Patented May 4, 1954

2,677,319

UNITED STATES PATENT OFFICE 2,677,319

APPARATUS FOR FORMING A VALVE IN A BAG AND APPLYING A SUPPLEMENTAL SLEEVE-FORMING SHEET THERETO

Adolph Potdevin, Garden City, N. Y., assignor to Potdevin Machine Company, Brooklyn, N. Y., a corporation of New York Application September 23, 1950, Serial No. 186,432

22 Claims. (Cl. 93—8)

This invention relates to apparatus for folding a valve and applying a sleeve-forming supplemental sheet to the valve in a bag blank of the gusseted type.

The apparatus is fully automatic in operation, in that the bag blanks are forwarded successively along a support, each blank during this travel being partially opened at its leading end. Thereafter the bag blank is held stationary, and after the formation of the valve and the application of the supplemental sheet the bag is discharged automatically from the machine.

More specifically, the present invention provides for spreading or separating the gusset at one corner of the bag blank and then infolding the same; during this operation, the edge of the infolded portion of the bag blank is folded outwardly to form a fin or flange, and the leading end of the supplemental sheet is placed behind this fin or flange; the fin or flange is then folded over upon the end of the supplemental sheet. The supplemental sheet may then be folded over upon itself and upon the infolded portion of the bag, after which the supplemental sheet and that portion of the bag immediately behind it are folded or tucked to form a valve with the supplemental sheet applied thereto.

The supplemental sleeve-forming sheet prevents valve leakage and prevents the contents of the bag from sifting between the several sheets of paper forming the bag and its valve.

In the accompanying drawings,

Figs. 1 to 21, both inclusive, are fragmentary and perspective views showing the various operations upon the bag blank involved in the operation of this new and improved apparatus;

Fig. 22 is a side elevational view of part of the machine;

Fig. 23 is an end elevational view of the machine;

Fig. 24 is an elevational view of the mechanism for forming the supplemental sheets and advancing them toward the station where they are loaded into a sheet holder;

Fig. 25 is a plan view of the machine;

Figs. 26 and 27 are plan views somewhat enlarged of the supplemental sheet-feeding mechanism and the sheet-forming mechanism;

Fig. 28 is a fragmentary part sectional elevational view of the delivery end of the sheet-forming mechanism on line 28—28 of Fig. 26;

Fig. 29 is a plan view of the supplemental sheet;

Fig. 30 is a fragmentary plan view of the front end of the machine on an enlarged scale, with the supplemental sheet-forming and feeding mechanism omitted;

Figure 35:
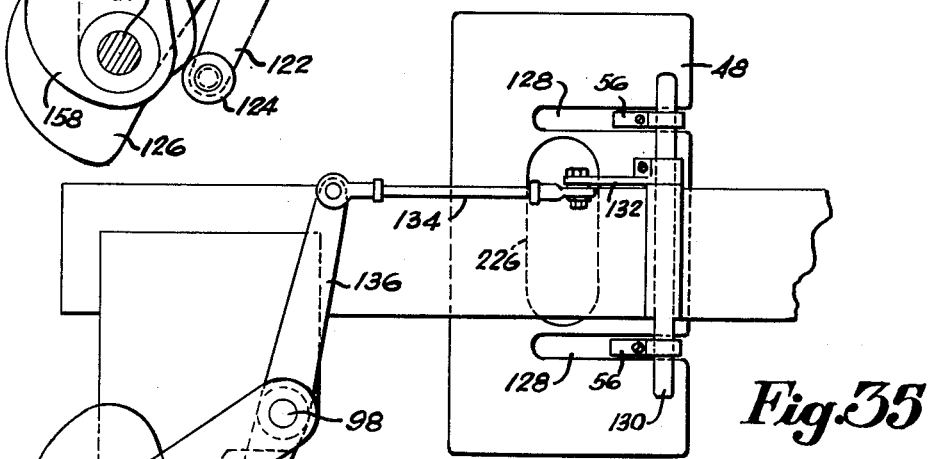

Figs. 31, 32, 33, and 34 are views taken on the lines 31—31, 32—32, 33—33, and 34—34 of Fig. 30;

Fig. 35 is an elevational view on the line 35—35 of Fig. 30;

Figs. 36 and 37 are front and side elevations of the clutch whereby a cam shaft of the machine is operated intermittently; and Fig. 38 is a fragmentary elevational view of a cam-controlled brake for braking the cam shaft of Figs. 36 and 37.

General description

For the sake of clarity of description, reference first of all will be made to Figs. 1 to 21, both inclusive, which show quite clearly the various operations performed upon the bag blank and portions of the mechanism for performing these operations.

Referring to these figures of the drawings, 2 designates a bag blank in which a valve is to be formed and a supplemental sleeve-forming sheet, designated 4, applied thereto. The bag blank comprises upper wall 6 and lower wall 8, each usually of multiply paper, the blank being folded inwardly along one side to provide gusset 10.

In making up the bag blank, one end is so cut as to provide a projection 12 at one corner of each wall. The valve is to be formed at this corner of the blank and supplemental sheet 4 applied thereto.

A supply of bag blanks which are to be operated upon may be stacked upon any convenient support 14 (see Fig. 22) and may be removed successively therefrom by hand or automatically and placed upon fixed support 16.

Along the rear edge of support 16 is rear edge guide or stop 18, while along the front edge of support 16 is guide or stop 20. The rear edge guide 18 is adjustable through rack and pinion 22 and 24 (see Fig. 23). This adjustment is provided to accommodate the machine to bag blanks of different widths.

As each bag blank is placed upon the support 16, it is moved forward until it encounters a pair of spreaders 28. These spreaders, which are of spring metal, are carried by a wedge-shaped member 30, the thin edge of which faces the bag blank. The spreaders are so positioned that, as the end of the bag blank encounters them, the spreaders will open the gusset 10 and spread or open the end of the bag blank to the extent illustrated in Fig. 4, for example.

After the blank has been thus positioned, it is pushed forward still further by a driven pusher 26. The stroke and position of this pusher are adjustable, so as to accommodate the machine to blanks and valves of different lengths.

In its endwise movement the end of the blank passes between upper and lower clamping plates or bars 32 and 34, which, at this time, are open. Upon further movement of the blank, it passes between backing plates 36 and 38 and over collapsed spreaders 40 and 42.

The backing plates 36 and 38 are in the same vertical plane at the forward end of support 16 and are spaced apart vertically sufficiently to permit of the passage of the partially opened end of the bag blank between them.

The clamping plates 32 and 34 extend transversely of the advancing bag blank and are cam-actuated and so timed as to close upon and clamp the upper and lower walls of the bag blank to each other behind the backing plates 36 and 38 at the end of the stroke of the pusher 26, the clamps in their closing movement closing the spreaders 28, as illustrated in Fig. 6.

The spreaders 40 and 42 are collapsible and expansible and cam-controlled. As will be brought out later herein, they extend transversely of the axis of travel of the bag blank and are hinged or pivoted along their rear edges. When collapsed or closed, they lie substantially face to face in a horizontal plane (see Fig. 31), and when expanded or opened, one plate swings upwardly and the other downwardly until they lie or stand in a vertical plane. These spreaders open immediately upon the closure of clamp plates 32 and 34.

It might be noted that the clamp plates do not open again until just before the spreaders 40 and 42 are collapsed again near the completion of operations.

Simultaneously with the opening or expanding of spreaders 40 and 42, a third spreader 46 is swung into engagement with the end of the bag blank at or near the corner of the bag blank remote from projection 12.

The result of the opening or expanding of the spreaders 40 and 42 and the operation of the third spreader 46 is to increase the spreading or separating of the walls of the bag blank beyond that provided by the action of the first pair of spreaders 28 and to swing or fold the corner of the bag blank inwardly across the end of the bag blank, to provide a plane area which stands almost flat against the outer face of the backing plates 36 and 38. During this infolding of the corner of the bag blank, a holder 48, carrying the supplemental sheet 4, is swung inwardly toward the end of the bag blank. The inward movement of this holder is so directed and timed that the front edge thereof will engage the walls of the bag length just slightly to one side of the notch 13 where the projections 12 meet the main portion of the bag length end, as shown in Fig. 9, for example, and will be engaged by the edge 50 of the portion of the bag blank which is being infolded, so that this edge will be folded outwardly, away from the end of the blank, substantially at right angles to the infolded area, to provide a fin or flange 52. The end of the supplemental sheet 4, which is carried by the holder, will, due to this action, be placed behind the fin or flange.

With the leading end of the supplemental sheet behind the fin or flange 52, a pair of pivoted presser plates 54 are actuated. These plates initially stand away from the backing plates 36 and 38, as illustrated in Fig. 9, for example. Upon actuation of the plates, they are swung inwardly until they stand parallel to the backing plates and are in contact with the infolded area of the bag blank (see Fig. 13). Upon reaching this position, the presser plates are moved forward along the face of the infolded area of the bag blank until they reach the position illustrated in Fig. 15.

As the presser plates are moved inwardly into contact with the infolded area of the bag blank, the supplemental sheet holder 48 begins its outward movement back to its original position. The supplemental sheet 4, however, is held against this outward movement by fingers 56.

The forward movement referred to of the presser plates begins simultaneously with the outward or retractive movement of the sheet holder, so that the flange or fin 52 of the infolded corner of the bag blank will be folded over upon the end of the supplemental sheet, as illustrated in Fig. 15.

As soon as the holder 48 has moved outwardly slightly, the sweeper or folder arms 58 and 60 are swung inwardly between the inner edge of the supplemental sheet holder and the end of the bag blank. These arms are so arranged as to fold the supplemental sheet over upon the outer face of the infolded area of the bag blank. This has been illustrated in Figs. 16, 17, and 18.

The spreaders 40 and 42 are still in expanded or extended position behind the infolded plane area of the bag blank and the superimposed supplemental sheet 4.

Figure 18:
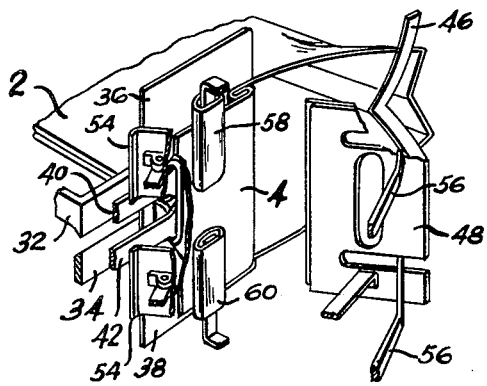
Figure 19:
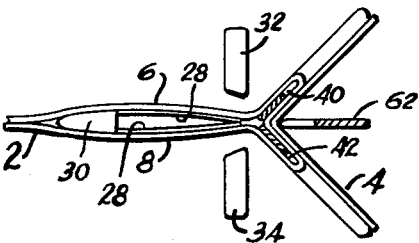
Figure 20:
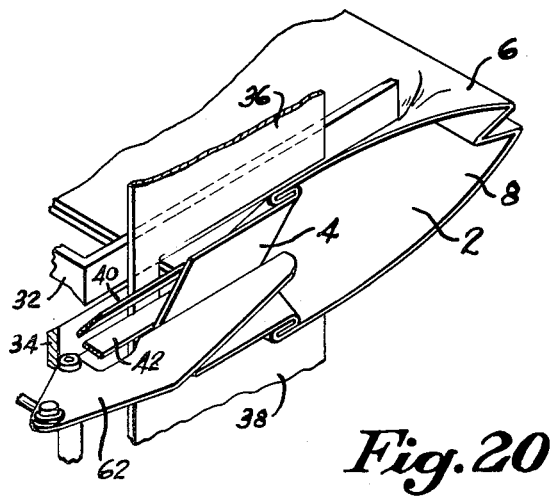
Figure 21:
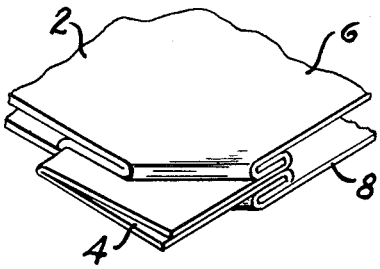
Figure 33:
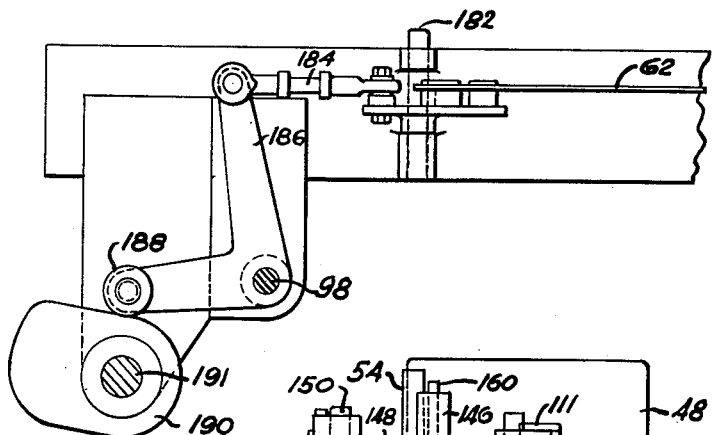

At this time, a tucker plate 62 is moved edgewise into engagement with the supplemental sheet, the clamp bars 32 and 34 are opened, and the spreaders 40 and 42 are collapsed to fold the infolded plane area and the superimposed supplemental sheet outwardly of the bag length, as illustrated in Fig. 20, to complete the valve forming operation, so that the bag now appears as illustrated in Fig. 21.

The plate 62 is then swung outwardly, and the finished work is discharged laterally from the machine.

The foregoing description merely outlines the invention in a more or less general fashion, so that the detailed description now to be given will be more readily understood.

Supporting and forwarding mechanism for the bag blanks

As above pointed out, the bag blanks may be stacked upon a stationary support 14 at the back of the machine and taken from there, automatically or by hand, and placed successively upon the stationary support 16.

The adjustable backstop 18 and the strip 20 along the front edge of the support 16 have already been referred to, and it has been pointed out that, by adjusting the backstop 18, bag blanks of different widths may be accommodated.

The pusher 26, by which the bag blanks are pushed forward along the support 16, is mounted on a bar 66, which is mounted beneath the support on rollers 67, carried by the support. The position of the pusher on the bar 66 may be varied. The support 16 is provided with a slot 68 (Fig. 1), extending lengthwise of the support, the pusher projecting through this slot above the surface of the support.

The bar 66 and, hence, the pusher are reciprocated positively by lever 70, which is rigid with another lever 72, these two levers being oscillated about a common axis 74 through connecting rod 76, which is attached to the free end of lever 72 and driven through crank 78. The throw of the lever 70 may readily be varied by shifting the point of attachment of rod 76 to lever 72, thereby varying the stroke of the pusher. By varying the throw of the pusher as well as its position on the bar 66, the machine will accommodate bag blanks and valves of different lengths.

It is to be understood that, by making adjustment for bag blanks of different widths and different lengths along the rear edge and rear end of the bag blanks, the mechanism which is to operate upon the front end of the bag blanks requires no adjustment to accommodate blanks of different dimensions.

*First spreaders, backing plates and clamp bars*

The stationary spreaders 28 are best seen in Figs. 4, 6, and 30 of the drawings and simply comprise two metal plates extending forwardly in the direction of travel of the bag blanks, their rear ends being attached to wedge-shaped member 30, so that their outer ends are spread apart. The wedge-shaped member 30 is mounted on the machine frame in any convenient fashion. The spreaders are positioned a short distance beyond the end of the bag blank support 16 and to one side of the center line of the support, so that, as the bag blank is advanced lengthwise along the support, the spreaders will enter the edge of the blank to spread or separate the gusset of the blank at one corner of the blank.

The backing plates 36 and 38 are simply two rigidly mounted metal plates, extending transversely of the machine. They are mounted a short distance beyond the spreaders 28 and, as will be seen from Fig. 10, they lie in the same vertical plane but are spaced from each other sufficiently for the partially spread bag blank end to pass between them as the blank is pushed forward.

The clamps or clamp bars 32 and 34, which are provided to grip the blank walls after the end of the blank has passed between the backing plates 36 and 38 and to clamp the walls to each other at the end of the stroke of pusher 26, comprise two metal bars extending transversely of the machine and located just to the rear of the fixed backing plates 36 and 38. As will be seen from Figs. 30 and 31, the bars extend transversely of the machine and are then bent so as to extend rearwardly of the machine. These rearwardly extending portions of the bars are pivotally mounted intermediate their ends on a common pivot 82. On the rear extremity of each bar is a cam follower roller 84; the roller for the upper bar 32 cooperates with a driven cam 86, the roller for the lower bar 34 cooperates with driven cam 88. These cams, as will be brought out later, are so shaped as to cause the clamp bars to close upon the bag blank at the end of the pusher stroke and hold them closed throughout subsequent operations upon the blank.

It will be seen from Figs. 4, 6, and 10 that the clamp bars 32 and 34 slightly overlap the outer ends of the spreaders 28, so that, as the bars close, the spreaders 28, which are of spring metal, will be closed also, as illustrated in Fig. 6.

*Second and third spreaders*

The positively actuated spreaders 40 and 42 are in front of the backing plates 36 and 38 and function immediately following the closing of the clamp bars.

The spreaders 40 and 42 comprise two metal plates, in effect hinged to each other by a common pintle 90. They extend transversely of the machine and initially are positioned as shown in dotted lines in Fig. 31. They are adapted to be pivoted about pintle 90 into extended or opened position, at which time they extend vertically and in a single plane, as illustrated in full lines in Fig. 31.

The upper spreader blade 40 is attached at its rear face above the pintle 90 to a lever 92, while attached to the rear face of the other blade, below the pintle, is lever 94. The free ends of these two levers are pivotally attached to a lever 96, which in turn is pivoted intermediate its ends on rod 98. The free end of lever 96 carries cam follower roller 97, which cooperates with a driven cam 101. The roller 97 is in contact with the active part of cam 101, as illustrated in Fig. 31, so that the spreader blades are shown, in full lines, in open or expanded position.

The spreader 46, which engages the open end of the bag blank toward the rear edge of the blank as the spreaders 40 and 42 open is mounted at the outer extremity of an arm 100 (see Fig. 22), the lower end of which is rigidly attached to a rod 102, which is mounted on the machine frame. The rod 102 carries a lever 106, carrying at its free end a cam follower roller 108, cooperating with driven cam 110 (Figs. 22 and 23).

*Supplemental sheet holder*

The holder 48 for the supplemental sheet is composed of a pair of rectangular plates disposed side by side and spaced sufficiently from each other to permit a supplemental sheet 4 to be inserted between them at the top of the holder. The lower end of the holder assembly is closed.

Figure 34:
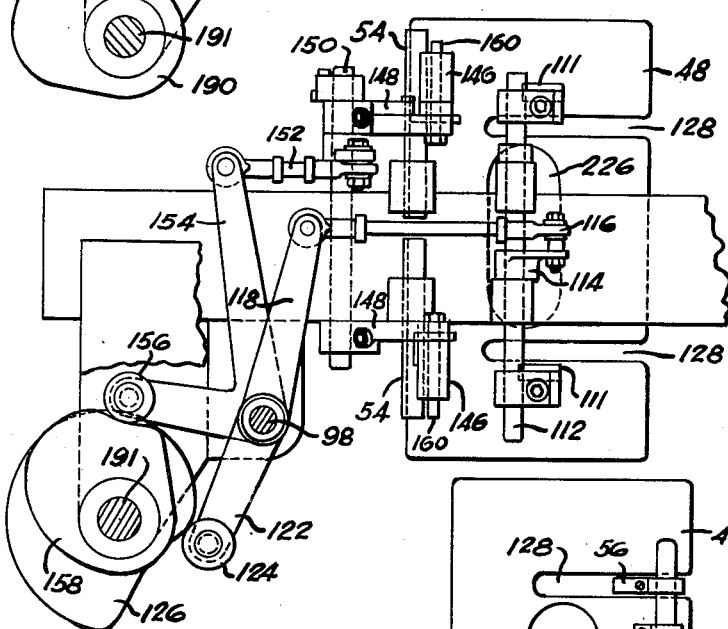

The holder assembly is carried at the free end of arms 111 (Figs. 30 and 34), which are secured to vertically extending rod 112 on the machine frame. Secured to the rod 112 is a crank 114, attached to one end of rod 116, the other end of which is attached to one arm 118 of a bell crank lever, which is pivoted on the shaft 98, the outer end of the other arm 122 of this bell crank lever carrying cam follower roller 124, cooperating with driven cam 126 (Figs. 30 and 34).

The holder 48 stands vertically of the machine, and it will be apparent that it will be swung bodily in an arc of a circle about the axis of rod 112 through the mechanism just described.

The two plates composing the sheet holder are provided with transverse slots 128, which are open at their outer ends, that is, at the outer edge of the holder. These slots are for the reception of the two sheet-retaining fingers 56. The function of these fingers is to restrain the supplemental sheet 4 from being withdrawn from behind the fin 52 of the infolded area of the bag blank as the sheet holder 48 is being retracted to its loading station. The fingers are secured to a rod 130, to which is attached a crank arm 132, in turn attached to one end of connecting rod 134, the other end of which is attached to one end of lever 136. This lever is pivoted on 98 and at its other end carries cam follower roller 140, cooperating with driven cam 142. By this arrangement, the fingers 56 are so controlled as not to interfere with loading of the sheet holder and to retain the sheet in position with respect to the end of the bag blank when the holder is being retracted for the next loading (Figs. 30 and 35).

Presser plates

The presser plates 54 are pivotally mounted on the inner end of levers or arms 146, which extend transversely of the machine, the outer ends of arms 146 being pivotally attached to levers 148, which in turn are rigidly attached to pivot pin 150. Rigid with the pivot pin 150 is a lever 152, connected to one arm 154 of a bell crank lever pivoted at 98 (see Fig. 34), the other arm of this lever carrying cam follower roller 156, cooperating with driven presser plate cam 158 (Figs. 30 and 34). Rigid with the pivot pin 150 and, hence, rigid with respect to lever 152 are levers 153. A spring is connected at one end to the outer end of each lever 153, its other end being attached to a pin in a slot 149 provided in each arm 146.

As mentioned, the presser plates are pivoted to levers or arms 146, this connection taking the form of a short rod 160 extending through the end of each of the levers or arms, and straps 162, which are attached to the plates and through which the rods 160 extend. The end of each strap 162 projects beyond rod 160, and attached to each is one end of a spring 164, the other end of each spring being attached to its respective lever 146.

When the presser plates are in inactive position (as in Fig. 9, for example), the levers 146 will have been retracted and swung away from the position shown in Fig. 30 to the position illustrated in Fig. 9, for example. During this movement of the levers, each plate will have been pivoted about 160 under the action of springs 164 (see Fig. 9). On their forward or reverse movement, the levers or arms 146 will move until the heels of the presser plates will have engaged the face of the infolded area of the bag blank, so that the plates will be pivoted inwardly about 160 parallel to the backing plates. The levers or arms 146 will finally engage the stops 147, as illustrated in Fig. 30, continued movement of lever 148 causing the levers or arms 146 and the presser plates 54 to slide along the face of the bag tube.

Folder rods and tucker plate

The folder rods 58 and 60, which fold the supplemental sheet 4 over upon the infolded portion of the corner of the bag blank, are attached to two arms 166, affixed to vertically extending rod 168, mounted for rotative movement in suitable bearings, this rod 168 carrying crank arm 170, to which one end of member 172 is attached. The other end of member 172 is attached to member 174, pivoted on 98, this member carrying cam follower roller 176, cooperating with folder cam 178 (see Figs. 30 and 32).

The tucker plate 62 is pivoted at 182 and is actuated through link 184, bell crank lever 186 pivoted at 98, cam follower roller 188, and cam 190. This mechanism will swing the plate in an arcuate path toward and away from the end of the bag blank.

It is to be noted that the cams 86, 88, 101, 110, 126, 142, 158, 178, and 190 are all mounted on the same shaft 191.

Supplemental sheet-forming and delivery mechanism

The mechanism for forming and delivering the supplemental sheets to the sheet holder 48 is best illustrated in Figs. 24 to 28, inclusive.

The paper for the supplemental sheet is taken from a supply roll 192 at the front end of the machine and is led upwardly over roller 194 to feed rollers 196 and 198 and from thence to cut-off blades 200 and 202. In its passage to the feed rollers 196 and 198, the paper passes over a fixed knife 204, the edge of which extends diagonally with respect to the paper travel and which cooperates with a rotary knife 206, the edge of which is set parallel to 204 to taper one edge at 207 of the paper, as seen in the plan view of Fig. 29.

After the supplemental sheet is severed from the main sheet, it falls upon table 208 and is pushed along this table by lugs 209 on chain 210 to pasting and scoring mechanism. This pasting and scoring mechanism comprises paste-applying rollers 212 and scoring rollers 213, the rollers 212 applying a stripe of paste 215 (Fig. 29) along the side of the sheet, and rollers 213 scoring the sheet at 218 just along the inner edge of the paste stripe.

After the sheet passes the scoring and pasting mechanism, it is forwarded by the chain 210 to upper and lower feed rollers 220 at the delivery end or loading station of the supplemental sheet mechanism.

At this end or loading station, sets of fingers 222 are provided for guiding the end of the sheet downwardly into the top of the sheet holder 48. To assist in this operation, rollers 224 are provided between the fingers 222, the sheet passing between these rollers and the lower feed rollers 220.

In one wall of the holder 48, I provide a slot 226. At the delivery end of the supplemental sheet mechanism and some distance below the fingers 222 is a driven brush 228, the periphery of this brush contacting the face of the supplemental sheet as the latter is being moved downwardly into the holder 48, so that the sheet is necessarily moved its full length into the holder.

Driving mechanism

The driving mechanism comprises main driving motor 230, belt 232 to pulley 234, pinion 236 on the shaft upon which pulley 234 is mounted, gear 238, pinion 240 to gear 242 and from gear 242 to pinion 244.

The pinion 244 is mounted upon a sleeve 246 constituting one element of clutch mechanism 248, through which the cam shaft 191 is to be driven intermittently. The sleeve 246 is mounted upon the cam shaft 191. Keyed to the cam shaft 191 and concentric with the sleeve 246 is another sleeve 250. The sleeve 246, as will be seen from Fig. 37, extends into the sleeve 250. The sleeve 250 is provided with laterally spaced peripheral flanges 252. Pivotally attached to the sleeve 250 between the two flanges 252 is a pawl 254, the pivot for the pawl being designated 256.

While the pawl 254 is pivoted on the exterior of sleeve 250, its tail projects through the wall of the sleeve and is adapted to engage a notch 257, provided in the sleeve or bushing 246, so that, with the tail of the pawl engaging this notch, the two sleeves 246 and 250 are in effect keyed to each other. Inasmuch as sleeve 246 is rotating constantly, and inasmuch as the cam shaft 191 is keyed to sleeve 250, the shaft 191 will be driven whenever the pawl is in operative position.

The pawl 254 is held in locked or operative position by spring 258.

Inasmuch as the purpose of this clutch arrangement is to effect intermittent rotation of the shaft 191, some means must be provided for disengaging the pawl. This takes the form of a member 260, pivotally mounted at 261 above the sleeves 246 and 250 and having a cam surface 262 on its free end. The pawl-controlling member 260 is swung on its pivot through rod 264, bell crank lever 266, cam follower roller 268 and cam 270. The cam 270 is mounted on the same shaft 271 as gear 242.

It is to be noted that the crank 76, which drives the bag blank pusher 26, is driven from the shaft 271, just mentioned.

The completed bags are discharged laterally from the machine by discharge chains 272, which are equipped with grippers 274 for gripping the rear edge of the bag and drag it to the right, as viewed in Fig. 23. The drive for these chains is from gear 276 on the shaft 271, gear 278, shaft 280, bevel gears 282, 284, sprocket 286, chain 288, sprocket 290 to shaft 292. One end of the discharge chains 272 runs over sprockets 294, which are on the shaft 292, the other end of the discharge chains running over sprockets 296 on a shaft 297, which extends parallel to 292.

The drive for the supplemental sheet mechanism is taken from the shaft 298, which carries the sprocket 286. On this shaft 298 is sprocket 300, which drives chain 302, the other end of this chain passing over sprocket 304, mounted intermediate the ends of a transverse shaft 306. On one end of this shaft 306 is sprocket 308, carrying chain 310, the other end of the chain running about sprocket 312 on the shaft 314, carrying the brush 228, which, as above mentioned, is provided at the delivery end of the supplemental sheet mechanism.

The shaft 306 at its end remote from sprocket 308 carries a gear 316, meshing with gear 318, mounted intermediate the ends of a shaft 320, which is parallel to the shaft 306.

On one end of shaft 320 is sprocket 322, which, through chain 324 and sprocket 326, drives the delivery rollers 220.

On the end of the shaft 320 remote from the sprocket 322 is another sprocket 328, carrying chain 330, which runs over sprocket 332 on the shaft 334, carrying paste roller 212 and lower scoring roller 213.

The forwarding chain 210 passes over a sprocket 336 on the shaft 320, the rear end of this chain passing about sprocket 338 on shaft 340, which is geared to the forwarding rollers 196 and 198, the cut-off blades 200 and 202, and the forwarding rollers 203 just beyond the cut-off blades.

On the outer end of the shaft 340 is a sprocket 342, carrying chain 344 for driving transverse shaft 346 at the feed end of the supplemental sheet mechanism. This shaft carries bevel gear 348, meshing with bevel gear 350 on the end of the stub shaft 205, carrying the rotary knife 206.

Braking mechanism 352 (see Figs. 23 and 38), operated intermittently by cam 354, is provided for the cam shaft 191. This provides for application of a brake to stop the cam shaft each time the clutch mechanism of Figs. 36 and 37 is disconnected.

*Operating cycle*

Although a cycle of operation of the machine has been described at the beginning of this specification, this description is rather general, so that, for a clearer understanding of the operation of the machine, a cycle of operation will now be described in more or less full detail.

It is believed that the forming of the supplemental sheets 4 and the forwarding of these sheets successively to the discharge end of the mechanism illustrated in Fig. 26, for example, will be clearly understood.

It may be assumed then for clarity that the machine has been started and that a supplemental sheet is about to be discharged into the sheet holder 48. At that instant, the sheet holder is in its retracted position and stands at the discharge end of the supplemental sheet mechanism, ready to receive a supplemental sheet.

It will be appreciated also that, at the instant of starting the machine, the pusher 26 is in retracted position; the clamps 32 and 34 are open; the spreaders 40 and 42 are closed, that is, are in the dotted-line position of Fig. 31, and the presser plates 54 have been retracted and pivoted away from the backing plates 36 and 38, as illustrated in Fig. 7, for example. The sheet-retaining fingers 56 are in retracted position, as shown in Fig. 9, and the folding rods 58 and 60, as well as the tucker plate 62, are also in retracted position.

A bag blank is now placed upon the support 16 and is moved forward until the spreaders 28 enter the side of the blank at the gusset 10, partially to spread or separate the walls of the blank (see Fig. 4).

The spacing of the backing plates 36 and 38 is such that, even although the bag blank is partially opened at the corner, it can pass between the plates. The pusher 26 then engages the rear end of the blank through the medium of crank 78 and associated mechanism, including the lever 76, and moves the bag blank forward until the end of the blank has passed beyond the backing plates and the second set of spreaders 40 and 42 (collapsed) have entered the side of the bag blank (see Fig. 5, for example).

At the end of the working stroke of pusher 26, the closing cams 86 and 88 for the clamp bars 32 and 34 have been rotated in position to close the clamp bars upon the bag blank, these bars gripping the blank at the forward end of the spreaders 28, so that in this clamping action these spreaders are closed, as illustrated in Fig. 6.

With the bag blank clamped against further movement, the spreaders 40 and 42, which, as noted, are lying within the gusset of the bag, are expanded or opened by their opening cam 101, and at about the same time the third spreader 46 is swung inwardly by its actuating cam 110 against the open end of the bag blank toward the rear edge of the blank (see Fig. 10).

The combined action of the second and third spreaders not only causes the corner of the bag at the spreaders 40 and 42 to be opened but to be infolded across the bag blank end.

During this infolding of the corner of the bag blank, the supplemental sheet holder 48 with a supplemental sheet therein is being swung inwardly from its loading station under action of cam 126 toward the opened end of the bag blank, the sheet-retaining fingers 56 swinging inwardly at the same time under the action of their cam 142.

These cams are so set that the leading edge of the sheet holder engages the end of the bag blank just slightly to one side of the notches in the walls of the blank and before the infolding operation is completed. Consequently, the edge of the area being infolded strikes the side of the sheet holder and is turned outwardly, to form a fin or flange 52. At the end of the inner or working stroke of the sheet holder, the edge of the holder and, hence, the leading end of the supplemental sheet are in the notches in the two spread walls of the bag blank.

On continued movement of cam 126, the holder will begin to swing outwardly again toward the loading station, the retaining fingers 56, however, at this moment remaining stationary.

Just prior to the beginning of the outward movement of the sheet holder, the presser plates 54 are actuated by their actuating cam 158. The heel of these plates first engages the face of the infolded area of the bag blank, and the plates then pivot until they lie flat against the infolded area. At this moment, the sheet holder begins its outward movement, and the presser plates are given a forward movement, so that the leading end of the supplemental sheet is nipped behind the fin 52, which is being folded over into the plane of the infolded area by the forward movement of the presser plates. This is illustrated in Figs. 13, 14, and 15. The corner of the bag has now been infolded to provide a plane area standing vertically in front of expanded spreaders 40 and 42 with the leading end of the supplemental sheet overlapped by this plane area.

After the sheet holder has moved outwardly slightly, the sheet-folding arms 58 and 60 are swung inwardly under the action of cam 178, to engage the rear face of the supplemental sheet between the outwardly moving sheet holder and the end of the bag blank, so that the supplemental sheet finally is folded over along the face of the infolded area of the blank, as illustrated in Fig. 17. Prior to completing this folding-over operation, the presser plates are returned to their initial position.

Up to this time, the clamping bars 32 and 34 have remained closed, and the spreaders 40 and 42 are in expanded position. The tucker plate 62 now begins to swing inwardly under the action of its cam 198. This is a flat plate or blade which is caused to swing edgewise into engagement with the face of the supplemental sheet about midway between the upper and lower edges of the sheet, and as this plate swings inwardly, the clamps 32 and 34 are opened and the spreaders 40 and 42 collapse. Inasmuch as by this time the presser plates 54, the sheet holder 48, the folder arms 58 and 60, and the spreader 46 have all been retracted, the walls of the bag blank are free to collapse toward the tucker plate. Following the collapse or closure of the spreaders 40 and 42, the tucker plate 62 is swung outwardly again, so that the end of the blank will then appear as in Fig. 21.

The bag blank is now in condition to be discharged from the machine.

The blank is discharged laterally toward the back of the machine, namely, from left to right, as viewed in Fig. 23.

As previously pointed out, discharge chains 272 carry discharge grippers 274, which grip the rear edge of the finished blank. These grippers co-operate with a fixed cam 380, so that, at the proper instant, the grippers will be closed upon the bag blank and held closed until the blank has been moved the necessary distance to the rear to effect its discharge.

As previously pointed out, the backstop 18 is adjustable transversely of the machine, to accommodate bags of different widths. In addition to this adjustment, the backstop has another novel feature.

As will be seen from Fig. 23, the upper edge of the backstop is pivoted on 382. Rigid with the stop is a bracket 384, which is fastened to the rear face of the stop at its upper edge near one end of same.

Secured to the underside of the racks 22, which are part of the adjusting mechanism for the backstop, are brackets 386.

Parallel to the racks 22 is a slidable bar 388, to the outer end of which is pivoted a link 390, the lower end of the link being pivoted to the fixed bracket 386.

Attached to this end of the link 390 is an arm 392, the free end of which is connected to the free end of the bracket 384 by a link 394.

The bar 388 is actuated through bell crank lever 396 and cam 398, which is driven by gear 400, meshing with gear 402 on the shaft 232.

This arrangement provides for intermittent reciprocation of the bar 388 and, hence, for pivoting of the backstop 18 between the full and dotted line positions of Fig. 23. It will be understood that the mechanism is timed so that, as the bag blanks begin their rearward discharge movement, the backstop will be pivoted to the dotted line position of Fig. 23.

Rigid with the arm 392 are forwardly extending fingers 404, rigidly tied to each other by a rod 405. These fingers are depressed slightly when the backstop is pivoted to the dotted line position of Fig. 23 just before grippers 274 function, so as to ensure that the grippers will properly grip the rear edge of the bag blank as it is being discharged.

It will be understood that the machine is automatic in operation, the above cycle being repeated each time a bag blank is placed in the machine.

It will be appreciated furthermore that the supplemental sheet-forming mechanism is being operated constantly, and that it is so timed as to deliver a sheet to the sheet holder each time the holder is retracted to the loading station.

The pusher 26 is being reciprocated constantly, and the delivery chains and associated mechanisms operate continuously.

The other elements of the machine, however, operate intermittently because of the clutch provided and which periodically is engaged and disengaged, this clutch controlling the cam shaft 191.

It is to be appreciated that, each time the clutch is disengaged, the brake operates to brake the cam shaft 191 to prevent overrunning of the shaft.

It is to be understood that changes may be made in the details of construction and arrangement of parts hereinabove described and illustrated in the accompanying drawings without departure from the spirit and scope of my invention.

What I claim is:

1. In apparatus for folding a valve and applying a supplemental sheet to the valve in a bag blank which is gusseted along one side, the combination of a support for the bag blank; a fixed spreader adapted to enter a corner of the bag blank, partially to spread or open the same; means for moving the blank lengthwise after engagement with said spreader; clamps for clamping the walls of said blank a substantial distance to the rear of the leading end of the blank at the termination of said lengthwise movement of the blank; a pair of collapsible, hinged spreaders adapted to enter the corner of the blank just prior to the closure of said clamps; means for opening said hinged spreaders, to effect further spreading of the corner of the blank and an infolding of said corner transversely of the longitudinal axis of the blank; a supplemental sheet conveyor; means for moving the same toward the end of the stationary bag blank in timed relation to the infolding of the corner of the blank, so that the free edge of the infolding area will encounter the conveyor and this free edge will be folded outwardly to provide a fin or flange and to place the end of the supplemental sheet behind said fin or flange; means for retracting said conveyor; means for folding said fin or flange over upon the end of the supplemental sheet; retaining means for holding the supplemental sheet against retraction during the folding of said fin or flange upon the sheet, and means thereafter to fold the supplemental sheet over upon the infolded corner of the bag blank.

2. In apparatus for folding a valve and applying a supplemental sheet to the valve in a bag blank which is gusseted along one side, the combination of a support for the bag blank; a fixed spreader adapted to enter a corner of the bag blank, partially to spread or open the same; means for moving the blank lengthwise after engagement with said spreader; clamps for clamping the walls of said blank a substantial distance to the rear of the leading end of the blank at the termination of said lengthwise movement of the blank; a pair of collapsible, hinged spreaders adapted to enter the corner of the blank just prior to the closure of said clamps; means for opening said hinged spreaders, to effect further spreading of the corner of the blank and an infolding of said corner transversely of the longitudinal axis of the blank; a supplemental sheet conveyor; means for moving the same toward the end of the bag blank in such timed relation to the infolding of the corner of the blank that the free edge of the infolding area will encounter the conveyor and be folded outwardly to provide a fin or flange and to place the end of the supplemental sheet behind said fin or flange; means for retracting said conveyor; pressers for folding said fin or flange over upon the end of the supplemental sheet; and retaining means for holding the supplemental sheet against retraction during the folding of said fin or flange upon the sheet.

3. In apparatus for folding a valve and applying a supplemental sheet to the valve in a bag blank which is gusseted along one side, the combination of a support for the bag blank; a fixed spreader adapted to enter a corner of the bag blank, partially to spread or open the same; means for moving the blank lengthwise after engagement with said spreader; clamps for clamping the walls of said blank a substantial distance to the rear of the leading end of the blank at the termination of said lengthwise movement of the blank; a pair of collapsible, hinged spreaders adapted to enter the corner of the blank just prior to the closure of said clamps; means for opening said hinged spreaders, to effect further spreading of the corner of the blank and an infolding of said corner transversely of the longitudinal axis of the blank; a supplemental sheet conveyor; means for moving the same toward the end of the bag blank in timed relation to the infolding of the corner of the blank, to fold the free edge of the infolded area outwardly to provide a fin or flange and to place the end of the supplemental sheet behind said fin or flange; means for retracting said conveyor; means for folding said fin or flange over upon the end of the supplemental sheet; retaining means for holding the supplemental sheet against retraction during retraction of said conveyor and the folding of said fin or flange upon the sheet, and means thereafter to fold the supplemental sheet over upon the folded corner of the blank.

4. Apparatus for forming a valve and applying a supplemental sheet to the valve of a bag blank of the gusseted type, said apparatus comprising, in combination, a support for the bag blank; a stationary spreader; a pusher for moving the blank lengthwise along said support, with the stationary spreader in the gusset of the blank, thereby partially to separate the gusset of the blank at one corner of the leading end of the blank; another pair of closed operating spreaders forward of the first spreader, adapted to enter the gusset as the blank is advanced by the pusher; means for opening the last mentioned spreaders, to increase the separation of the blank gusset; a pair of clamps intermediate the first and second mentioned spreaders, operable prior to the opening of the last mentioned spreaders for clamping the walls of the blank to each other to the rear of the second mentioned spreaders, to hold the blank against movement; and a third spreader, operable to engage the end of the bag blank in an area remote from said corner, the travel of the two last mentioned spreaders being sufficient to effect enough further spreading of the blank to cause the material thereof to infold transversely of the blank and providing a plane area transverse of the blank and substantially at right angles to the plane of the blank.

5. Apparatus for forming a valve and applying a supplemental sheet to the valve of a bag blank of the gusseted type, said apparatus comprising, in combination, a support for the bag blank; a stationary spreader; a pusher for moving the blank lengthwise along said support and spreader, with the spreader in the gusset of the blank, partially to open the gusset of the blank at one corner of the leading end of the blank; cam-actuated clamps forward of said spreader to clamp the walls of the blank to each other and hold the blank against further longitudinal movement; additional spreading means, thereafter to open the blank walls still further and cause the material of the blank at said corner to be infolded across the end of the blank; a conveyor for a supplemental sheet; means for swinging this conveyor bodily toward the opened end of the blank, to bring the edge of the same into the path of the corner of the bag blank as it is being infolded to turn the edge of the infolded area outwardly in the form of a fin or flange.

6. Apparatus for forming a valve and applying a supplemental sheet to the valve of a bag blank of the gusseted type, said apparatus comprising, in combination, a support for the bag blank; a spreader; a pusher for pushing the blank forward along the support, with the spreader within the gusset of the blank; clamps for thereafter clamping the bag blank walls to each other to the rear of the spread area, to prevent further advance of the blank; additional spreaders thereafter separating the blank walls still further and to infold the spread corner of the blank across the end of the blank; a conveyor for a supplemental sheet; means for actuating said conveyor toward and away from the spread end of the bag blank, the conveyor, as it is swung toward the bag blank, being engaged by the material of the bag blank corner that is being infolded, to effect folding of the edge of the infolding material outwardly to form a fin or flange; a supplemental sheet carried by said conveyor; means for holding said sheet against movement as the conveyor moves away from the end of the blank; and presser means, operative as the conveyor is moving outwardly, to fold the said fin or flange over upon the end of the supplemental sheet.

7. Apparatus for forming a valve in and applying a supplemental sheet to the valve of a bag blank of the gusseted type, said apparatus comprising, in combination, a fixed spreader; a reciprocating pusher for moving the bag blank lengthwise along a stationary support and said spreader, the spreader separating the blank at one corner; clamp bars for clamping or gripping the bag blank to the rear of the leading end of the said corner of the blank, to hold the blank against further movement; cams for operating said bars; a second set of spreaders beyond the said first set and engaged by the blank for effecting further separation of the blank walls at said corner; a cam for operating the second mentioned spreaders; a third spreader for engaging the end of the bag blank remote from the area engaged by the second spreaders, further to separate the blank walls; a cam for actuating the third spreader, the second and third spreaders having sufficient movement further to spread the corner of the bag blank sufficiently to cause it to infold across the end of the blank; a driving motor for said cams; a clutch between said motor and cams; and a constantly driven cam for controlling said clutch, whereby the cams are intermittently rotated in a prescribed cycle.

8. Apparatus for forming a valve in and applying a supplemental sheet to the valve of a bag blank, said apparatus comprising, in combination, a reciprocating pusher for advancing the bag blank lengthwise along a stationary support; means for clamping or gripping the walls of the bag blank a substantial distance to the rear of its leading end upon the completion of the working stroke of the pusher; spreaders engageable with the bag blank for spreading or separating the bag blank walls sufficiently to effect infolding of the blank at one corner across the end of the blank to provide a plane area extending transversely of the blank and standing substantially at right angles to the plane of the face of the blank; cams for effecting operation of said spreaders; a shaft system common to said cams; a constantly operating driving motor; a clutch intermediate said motor and one shaft of the cam shaft system; cam mechanism continuously operated by said motor for controlling the clutch, whereby the clutch is disengaged intermittently, thereby to disconnect one cam shaft from the driving motor; and a cam-controlled brake for braking said cam shaft each time the said clutch is disengaged.

9. In apparatus for forming a valve in and applying a supplemental sheet to the valve of a bag blank, the combination of means for spreading the walls of a bag blank and infolding a corner of the same to provide a plane area extending transversely of the blank at said corner of the blank; a sheet holder movable toward the end of the bag blank as the blank is being infolded so as to be engaged by the portion of the blank being infolded, to cause the edge of said portion to be folded outwardly in the form of a fin or flange; presser plates for thereafter folding this fin or flange in the opposite direction; a pivotal mount for said plates; a spring initially maintaining said plates at an angle to the outer face of said infolded portion of the blank corner; and cam-actuated mechanism for pivoting said plates against the action of said spring, to bring the plates into parallelism with said infolded portion of the bag blank.

10. In apparatus for forming a valve in and applying a supplemental sheet to the valve of a bag blank, the combination of means for spreading the walls of a bag blank and infolding a corner of the same to provide a plane area extending transversely of the blank at said corner of the blank; a sheet holder movable toward the end of the bag blank as the blank is being infolded so as to be engaged by the portion of the blank being infolded, to cause the edge of said portion to be folded outwardly in the form of a fin or flange; presser plates for thereafter folding this fin or flange in the opposite direction; a pivotal mount for said plates; a spring initially maintaining said plates at an angle to the outer face of said infolded portion of the blank corner; and cam-actuated mechanism for pivoting said plates against the action of said spring, to bring the plates into parallelism with said infolded portion of the bag blank and to move said plates forward into contact with said flange or fin to fold the latter inwardly into the infolded plane.

11. In apparatus for forming a valve in and applying a supplemental sheet to the valve of a bag blank, the combination of means for spreading the walls of a bag blank at its leading end and infolding a corner of the blank to provide a plane area extending transversely of the blank at said corner of the blank; a supplemental-sheet holder disposed forwardly of the leading end of the bag blank, said holder having an open top and an open inner edge, whereby the holder may be loaded from the top and unloaded from its inner edge; a carrier for said holder; and a cam for actuating the carrier, to swing the holder inwardly toward the bag blank end into the path of the corner of the blank as it is being infolded, so that the edge of the infolded area is deflected outwardly in the form of a fin or flange, with the discharge edge of the holder lying behind the fin.

12. In apparatus for forming a valve in and applying a supplemental sheet to the valve of a bag blank, the combination of means for spreading the walls of a bag blank at its leading end and infolding a corner of the blank to provide a plane area extending transversely of the blank at said corner; a supplemental-sheet holder disposed forwardly of the leading end of the blank, said holder standing at right angles with respect to the plane of the bag blank; a carrier for said holder; a cam for actuating the carrier, to swing the holder inwardly toward the bag blank end into the path of the corner of the blank as it is being infolded, to deflect the edge of the infolded area outwardly of said area to form a fin or flange, the inner edge of said holder being open to permit of the discharge of a supplemental sheet therefrom, said holder and carrier being so proportioned that at the end of the inward stroke of the holder said discharge edge of the carrier will lie behind said fin or flange; and fingers extending through the side of said carrier and moving with the carrier on its inward stroke but remaining stationary on the outward stroke of the carrier for restraining a supplemental sheet carried by the holder against retractive movement as the holder swings outwardly away from the end of the bag blank.

13. In apparatus for forming a valve in and applying a supplemental sheet to the valve of a bag blank, the combination of means for spreading the walls of a bag blank at its leading end sufficiently to infold a corner of the blank to provide a plane area extending transversely of the blank at said corner; a supplemental sheet holder; a carrier therefor; a cam for actuating the carrier to swing the holder inwardly toward the end of the bag blank into the path of the corner of the bag blank as it is being infolded, to deflect the edge of the infolded area outwardly, said carrier cam thereafter operating to swing the holder away from the end of the blank; fingers cooperating with the holder and with a supplemental sheet carried by the holder, for retaining the end of the sheet behind said deflected edge of the infolded area of the bag blank as the holder is swung outwardly; means for folding the deflected edge of the infolded area rearwardly upon the end of the supplemental sheet; folder rods or arms; and a cam for swinging said arms between the edge of the holder, as the holder is being retracted, and the supplemental sheet, to fold the supplemental sheet over upon the infolded area of the bag blank.

14. In apparatus for forming a valve in and applying a supplemental sheet to the valve of a bag blank, the combination of means for spreading the walls of a bag blank at its leading end sufficiently to effect an infolding of a corner of the blank to provide a plane area extending transversely of the blank; a supplemental-sheet holder for deflecting the edge of the said area outwardly as said area is being infolded; discharge means for the holder whereby the end of the supplemental sheet remains behind said deflected edge when said holder is removed; means for folding said deflected edge over upon the end of the supplemental sheet; folder arms for thereafter folding the supplemental sheet over upon said infolded plane area of the blank; a tucker plate; a cam for moving said plate edgewise into engagement with the folded-over supplemental sheet, said plate extending transversely of the bag blank; and means thereafter operable to close the walls of the blank to tuck the supplemental sheet and the infolded area of the bag blank, to provide a valve at the corner of the blank with a supplemental sheet applied thereto.

15. In apparatus for forming a valve in and applying a supplemental sheet to the valve of a bag blank, the combination of means for spreading the walls of a bag blank at its leading end sufficiently to effect an infolding of one corner of the spread walls to provide a plane area extending transversely of the blank; a supplemental-sheet holder; means for swinging the said holder toward the spread end of the blank as the corner of the blank is being infolded, thereby to deflect the edge of the infolded area and place the end of a supplemental sheet carried by the holder behind said deflected edge; presser means for folding said deflected edge over upon the end of the supplemental sheet into the plane of said area; means thereafter to fold the supplemental sheet over upon the outer face of the plane area; a tucker plate; cam mechanism for moving said plate edgewise into engagement with the face of the folded-over supplemental sheet; and cam means thereafter to close said spreading means, to close the end of the blank upon said tucker plate to tuck the valve and sheet.

16. In apparatus for forming a valve in and applying a supplemental sheet to the valve of a bag blank, the combination of means for spreading the walls of a bag blank at its leading end sufficiently to infold one corner of the spread walls to provide a plane area extending transversely of the blank; a supplemental-sheet holder; cam-operated means for swinging the holder toward and away from the spread end of the blank as said corner is being infolded, to deflect the edge of the area being infolded out of the plane of the area; means for preventing withdrawal of the supplemental sheet from behind said deflected edge as the holder is moved on its outward stroke; presser means; a cam for effecting positive movement of the presser means across the said plane area, thereby to fold the deflected edge of the area over upon the end of the supplemental sheet; folding means; cam mechanism for actuating the same, to fold the body of the supplemental sheet over upon the plane area as the said holder is being retracted; a tucker plate; cam mechanism for moving said plate edgewise into engagement with the face of the folded-over supplemental sheet; cam mechanism for closing the corner of the bag blank upon said tucker plate, to tuck the valve and supplemental sheet; delivery chains extending transversely of the machine; grippers carried thereby; and cams for actuating said grippers after the bag blank has been closed, to grip the rear side edge of the bag blank to effect lateral discharge of the bag blank.

17. In apparatus of the class described, the combination of a pusher for effecting forward endwise movement of a bag blank; cam-operated spreaders for separating the walls of the bag blank at the leading end of the blank at the termination of said endwise movement sufficiently to infold one corner of the blank across the blank end to provide a plane area extending transversely of the bag blank; supplemental-sheet forming and forwarding mechanism forward of the said leading end of the bag blank; a supplemental-sheet holder; cam mechanism for swinging the holder toward and away from the end of the bag blank, said holder operating in timed relation to the supplemental-sheet forming and forwarding mechanism so as to receive a supplemental sheet therefrom and carry it toward the end of the bag blank as the corner of the latter is being infolded, the swing of the holder being such that, as the corner of the blank is being infolded, its edge will encounter the holder and be deflected outwardly with the end of the supplemental sheet behind it; cam-operated fingers operative to restrain the supplemental sheet against rearward movement as the holder swings away from the end of the bag blank; cam-operated mechanism for pressing the said edge of the plane area over upon the supplemental sheet; folders for thereafter folding the supplemental sheet over upon the face of the plane area with its end retained behind the said edge of the plane area; tucking means thereafter operating in conjunction with the said spreaders, to effect completion of the valve; and delivery chains running transversely of the bag blank, thereafter to effect lateral discharge of the bag blank.

18. In apparatus of the class described, the combination of forwarding means for effecting endwise movement of a bag blank; cam-operated spreaders for separating the walls of the bag blank at its leading end upon termination of said endwise movement and to infold one corner of the blank to provide a plane area extending transversely of the blank, said spreaders being mounted for movement about axes transverse of the longitudinal axis of the bag blank; a holder for a supplemental sheet; cam mechanism for swinging said holder from a sheet-loading station toward the said plane area of the bag blank and to return the holder to the loading station, the holder being mounted to swing on a vertical axis, said holder being timed to be encountered by the blank corner as it is being infolded, to deflect the edge of the material outwardly of the plane area; a discharge slot in the leading edge of the holder; and cam-operated fingers pivotally mounted on a vertical axis for preventing movement of a supplemental sheet carried by the holder as the holder is being retracted or returned to the loading station, thereby to initiate discharge of the supplemental sheet from the holder through said discharge slot.

19. In apparatus of the class described, the combination of forwarding mechanism for effecting limited endwise movement of a bag blank; cam-operated clamps for holding the blank stationary upon the termination of its endwise movement; cam-operated spreaders for separating the walls of the blank at its leading end following operation of said clamps sufficiently to infold one corner of the spread blank so as to provide a plane area extending transversely of the blank; a holder for a supplemental sheet; cam mechanism for oscillating said holder between a sheet-loading station and the said plane area, the holder being timed to be encountered on its inward stroke by the blank corner as it is being infolded, to deflect the edge of the material outwardly of the plane area; a discharge slot in the leading edge of the holder; cam-operated fingers preventing movement of a supplemental sheet carried by the holder as the latter is being retracted to the loading station, thereby initiating discharge of the sheet from the holder through said discharge slot; cam shafts for the cams of said cam-operated mechanisms; a constantly rotating drive shaft; a clutch between the drive shaft and cam shafts; a cam driven from the constantly driven shaft for intermittently engaging said clutch, to effect intermittent rotation of the cam shaft; a brake for the cam shaft; and a cam driven from the cam shaft for controlling the said brake, whereby, each time the cam shaft is disconnected from the drive shaft, a brake will be applied thereto.

20. In apparatus of the class described, said apparatus comprising, in combination, a reciprocating pusher for advancing a bag blank of the gusseted type along a fixed support for a limited distance; clamps for clamping the blank to hold the same in fixed position at the termination of the travel of the blank; collapsible spreaders adapted to enter the gusset of the blank during the said movement of the blank; cam-actuated mechanism for opening or expanding said spreaders after the closure of said clamps, to spread a corner of the blank; an additional cam-operated spreader for effecting a further spreading of the blank walls, the combined action of the spreaders infolding a corner of the blank across the first mentioned spreaders, to produce a plane area transverse of the bag blank at the said corner; a holder carrying a supplemental sheet; cam-operated mechanism for swinging said holder toward the spread end of the blank, the side of said holder being engaged by the infolded corner prior to the completion of the infolding operation, thereby to cause the edge of the infolding area to be folded outwardly of the area, so that the leading end of the supplemental sheet will be behind said outwardly folded edge; means for retracting the holder while retaining the supplemental sheet behind said outwardly turned edge; presser means and cam mechanism for pivoting said presser means into position parallel to and in contact with the outer face of said plane area, the presser means then being moved forward across said plane area to fold the outwardly extending edge of the plane area over upon the end of the supplemental sheet.

21. In apparatus of the class described, the combination of clamping means for clamping a gusseted bag blank a substantial distance to the rear of the leading end of the blank, to hold the blank against movement; spreaders for spreading the end of the blank walls in front of said clamping means so as to infold a corner of the blank sufficiently, to provide a plane area adjacent a corner of the blank extending transversely of the blank; a holder for a supplemental sheet; means for moving said holder in an arcuate path toward and away from the end of the blank; adhesive-applying means for applying a stripe of adhesive along one edge of the supplemental sheet, the said holder and supplemental sheet moving toward the end of the blank slightly in advance of the said infolding operation, so that the edge of the infolded area will be turned outwardly of the plane area and the pasted area of the supplemental sheet will lie behind said outwardly turned edge; means for folding the said outwardly turned edge over upon the adhesive-coated area of the supplemental sheet as the holder is moving away from the end of the blank; means thereafter to fold the supplemental sheet toward the said corner of the blank in superimposed relation to the face of the said plane area; and means for collapsing the walls of the blank while maintaining pressure upon the face of the supplemental sheet along a line extending transversely of the blank.

22. In apparatus of the class described, the combination of a support for a gusseted bag blank; means for separating the walls and gusset of the blank at one corner thereof; means for swinging or folding the said separated corner inwardly across the open end of the bag blank; a holder for a supplemental sleeve-forming sheet; actuating means for said holder, to move the same in such timed relation to the said infolding of the corner of the blank that the free edge of the infolded area will encounter the said holder and be deflected or folded outwardly to provide a fin or flange, and the leading end of the supplemental sheet carried by the holder will be placed behind said flange or fin; means operable thereafter to retract the holder; means detached from the supplemental sheet positively to retain the sheet in position behind said fin or flange while the holder is being retracted; and means to fold said flange or fin over upon the end of the supplemental sheet as the said sheet holder is being retracted.

References Cited in the file of this patent

UNITED STATES PATENTS

| Number | Name | Date |
| --- | --- | --- |
| Re. 23,486 | Lee | Apr. 29, 1952 |
| 1,650,895 | Kronmiller | Nov. 29, 1927 |
| 1,657,577 | Kronmiller | Jan. 31, 1928 |
| 1,723,165 | Hartman | Aug. 6, 1929 |
| 1,734,362 | Brownell | Nov. 5, 1929 |
| 1,840,232 | Hartman | Jan. 5, 1932 |
| 1,926,241 | Orr | Sept. 12, 1933 |
| 2,205,633 | Sharkey | June 25, 1940 |
| 2,387,274 | Lee | Oct. 23, 1945 |
| 2,442,431 | Peters | June 1, 1948 |
| 2,550,155 | Kraft | Apr. 24, 1951 |
| 2,559,873 | Grupe | July 10, 1951 |
| 2,643,588 | Burroughs | June 30, 1953 |